United States Patent [19]

Radomski

[11] Patent Number: 4,959,577
[45] Date of Patent: Sep. 25, 1990

[54] ALTERNATING CURRENT GENERATOR

[75] Inventor: Thomas A. Radomski, Utica, Mich.

[73] Assignee: General Motors Corporation, Detroit, Mich.

[21] Appl. No.: 425,270

[22] Filed: Oct. 23, 1989

[51] Int. Cl.$^5$ .............................................. H02K 1/22
[52] U.S. Cl. .................................. 310/263; 310/68 D; 310/156; 310/258; 322/28
[58] Field of Search .............. 310/263, 258, 168, 156, 310/181, 212, 159, 232, 68 R, 68 D, 254; 322/28

[56] References Cited

U.S. PATENT DOCUMENTS

| 3,392,294 | 7/1968 | Campbell | 310/168 |
| 3,411,027 | 11/1968 | Rosenberg | 310/181 |
| 3,555,327 | 1/1971 | Terry | 310/168 |
| 4,488,075 | 12/1984 | De Cesare | 310/156 |
| 4,636,706 | 1/1987 | Bowman | 322/29 |
| 4,882,515 | 11/1989 | Radomski | 310/168 |

FOREIGN PATENT DOCUMENTS

| 0112008 | 9/1964 | Czechoslovakia | 310/263 |
| 0020748 | 2/1985 | Japan | 310/168 |
| 0280292 | 4/1952 | Switzerland | 310/263 |

*Primary Examiner*—R. Skudy
*Attorney, Agent, or Firm*—Creighton R. Meland

[57] ABSTRACT

An alternating current generator for supplying the electrical loads on a motor vehicle. The generator has a stator core that carries a three-phase stator or output winding. The rotor of the generator has two claw pole members that are magnetically connected by a core. A field coil is disposed about the core. The pole fingers of the claw pole members are interleaved and a plurality of permanent magnets are secured to side surfaces of the pole fingers such that there is a permanent magnet between each pair of adjacent pole fingers. The generator is arranged such that flux developed by the permanent magnets can flow through a closed magnetic path that bypasses the air gap between the rotor and stator and such that energization of the field coil with unidirectional current cause permanent magnet flux to traverse the air gap between the rotor and stator and thereby provide a useful flux for generating voltage in the stator winding.

2 Claims, 2 Drawing Sheets

ALTERNATING CURRENT GENERATOR

This invention relates to alternating current generators and more particularly to alternating current generators for supplying electrical power to the electrical loads on a motor vehicle including charging the vehicle storage battery.

Because motor vehicles have ever increasing power demands, an alternator with greater electrical output, higher power to weight ratio and better conversion efficiency is needed.

This invention proposes to increase the power output of an alternating current generator by utilizing a Lundell rotor for the generator that has a field coil and a plurality of permanent magnets that are interposed between adjacent pole fingers of claw tooth pole members.

Alternating current generators that use permanent magnets and control windings are disclosed in the U.S. Pat. No. 3,411,027 to Rosenberg. In that patent, field flux diverted by the control windings is carried by the end frames and a tubular frame connecting the end frames and the control windings are stationary. This type of construction leads to large heavy machines.

In contrast to the alternating current generator disclosed in the Rosenberg patent, the generator of this invention utilizes a Lundell rotor that is comprised of two claw-pole members having interleaved pole fingers and a field coil that is disposed about a magnetic core. The claw-pole members, core and field coil are supported and secured to a rotor shaft so that they all rotate together. The field coil is connected to slip rings which rotate with the shaft and which contact brushes. The rotor is provided with a plurality of permanent magnets with each permanent magnet being interposed between and in contact with side surfaces of adjacent pole fingers of the claw-pole members. Flux developed by the field coil crosses the air gap between the rotor and stator in a conventional fashion. However, the flux developed by the permanent magnets can bypass the air gap between the rotor and stator or can be caused to traverse the air gap between the rotor and stator by energization of the field coil with unidirectional current.

More specifically, the flux developed by the permanent magnets can pass through a closed magnetic path that is comprised entirely of magnetic material. This path is comprised of the two claw-pole members and a core that engages the claw pole members. This closed magnetic path shunts or bypasses the air gap between the rotor and stator so that except for leakage flux, the flux developed by the permanent magnets does not link the stator winding. When the field coil is energized with unidirectional current, the magneto-motive force (mmf) developed by the field coil opposes the permanent magnet (mmf) in the closed magnet circuit and thereby causes the permanent magnet flux to cross the air gap between the rotor and stator and link the stator winding.

It, accordingly, is an object of this invention to provide an alternating current generator of the type that has been described that can control both field flux and permanent magnet flux by controlling unidirectional field current.

Another object of this invention is to provide a voltage regulated alternating current generator of the type described where field current is controlled by a conventional switching voltage regulator.

IN THE DRAWINGS

Figure 1:
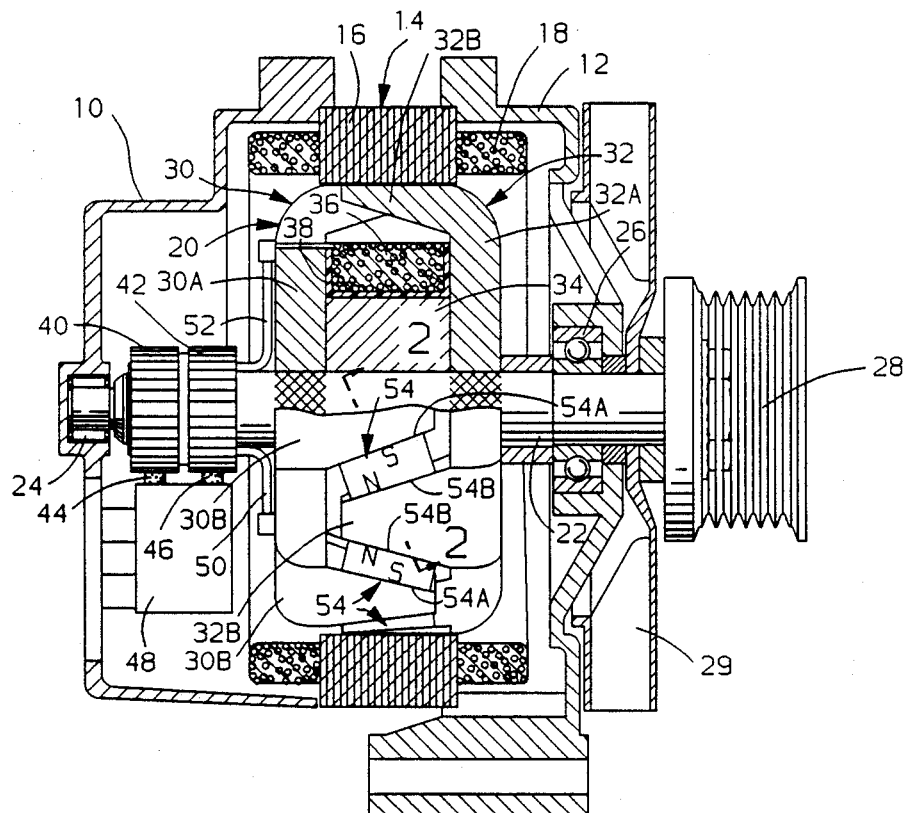
FIG. 1 is a sectional view of an alternating current generator made in accordance with this invention.

Referring now to the drawings and more particularly to FIG. 1, the alternating current generator of this invention comprises metallic end frames 10 and 12 that support a stator assembly 14. These end frames are typically formed of aluminum. A plurality of throughbolts (not illustrated) are used in a known manner to secure the end frames together. The stator assembly 14 is comprised of a slotted stator core 16 formed of a stack of steel laminations that carries a three-phase stator or output winding 18. Portions of the stator winding 18 are located in the slots of stator core 16 as is well known to those skilled in the art.

The alternating current generator has a rotor generally designated by reference numeral 20. This rotor is comprised of a shaft 22 that is supported for rotation by bearings 24 and 26. A pulley 28 is connected to shaft 22 and a cooling fan 29 is secured to the shaft.

The rotor 20 further comprises claw pole members 30 and 32 and an annular core 34, all of which are secured to shaft 22 to rotate therewith. The ends of core 34 respectively engage pole members 30 and 32. Pole members 30 and 32 and core 34 are all formed of magnetic material such as steel.

The core 34 supports a field coil 36 that is carried by a spool 38 that is formed of insulating material. The spool and field coil form parts of the rotor and rotate relative to the stator whenever the rotor is rotated.

The rotor shaft 22 carries metallic slip rings 40 and 42 that are electrically insulated from each other and from shaft 22. The slip rings are engaged by brushes 44 and 46 that are supported by brush holder 48. The slip ring 40 is connected to one side of field coil 36 by a conductor 52. The opposite side of field coil 36 is connected to slip ring 42 by a conductor 50.

The rotor pole members 30 and 32 are identical. Pole member 30 has a disk portion 30A and six circumferentially spaced and axially extending pole fingers 30B. Pole member 32 has a disk portion 32A and six circumferentially spaced and axially extending pole fingers 32B. It can be seen that the pole fingers 30B and 32B are interleaved, that is, pole fingers 30B are located in spaces between pole fingers 32B and vice-versa.

Figure 2:
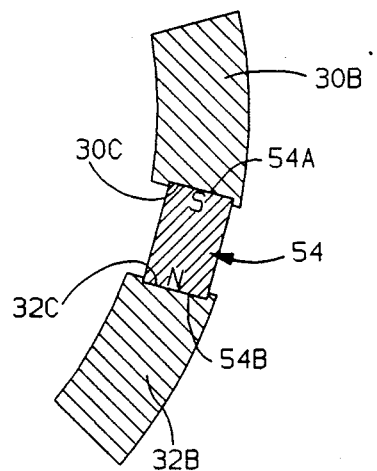
FIG. 2 is a sectional view taken along line 2—2 of FIG. 1.

The rotor has twelve permanent magnets each of which is designated as 54. Each permanent magnet 54 has opposed end faces 54A and 54B that engage respective side surfaces on pole fingers 30B and 32B. The sides of permanent magnets 54 fit into slots or grooves 30C and 32C formed in pole fingers 30B and 32B shown in FIG. 2. The permanent magnets are press-fitted into the grooves or slots and may be secured to the pole fingers by a suitable adhesive. The faces 54A and 54B have opposite magnetic polarities. Thus, it will be assumed in the further description of this invention that faces 54A have a south magnetic polarity and that faces 54B have a north magnetic polarity.

Although only two permanent magnets 54 have been shown in FIG. 1, it is to be understood that 12 magnets are used, and that there is a permanent magnet 54 between each pair of opposed side surfaces of pole fingers 30B and 32B. Further, the permanent magnets are arranged such that the opposed sides of pole fingers 32B are respectively engaged by magnet surfaces 54B of a north magnetic polarity and opposed sides of pole fingers 30B are engaged by magnetic surfaces 54A of a south magnetic polarity. This arrangement causes all the pole fingers 32B to have a north magnetic polarity and all the pole fingers 30B to have a south magnetic polarity.

Figure 4:
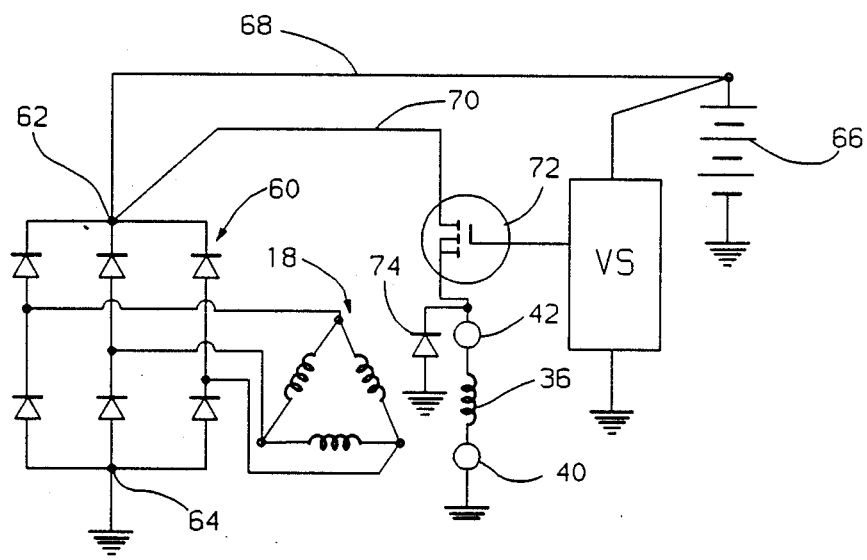
FIG. 4 is a circuit diagram of a voltage regulating arrangement for controlling field current of an alternating current generator.

The field coil 36 of the generator, shown in FIG. 1, is energized with unidirectional current by a voltage regulating arrangement that is shown in FIG. 4. In FIG. 4, output winding 18 is shown as being Delta-connected but it could be Y-connected if so desired. The stator or output winding 18 is connected to a three-phase, full-wave bridge rectifier 60 having a positive direct voltage output terminal 62 and a grounded negative direct voltage output terminal 64. The positive terminal 62 is connected to the positive terminal of storage battery 66 by line 68.

Unidirectional current is supplied to field winding 36 by line 70 and a field effect transistor 72 which forms a part of a conventional generator voltage regulator. The drain of transistor 72 is connected to line 70 and its source is connected to one side of field coil 36 through slip ring 42. The opposite side of field winding 36 is grounded through slip ring 40 and a field discharge diode 74 is connected across field winding 36. The gate of transistor 72 is connected to a voltage sensing circuit identified as VS. The voltage sensing circuit is connected between the positive side of battery 66 and ground and it accordingly senses the voltage across battery 66. The voltage regulator is of the type disclosed in the U.S. Pat. No. 4,636,706 to Bowman et al. When the voltage between line 68 and ground is above the desired regulated value, the voltage sensing circuit VS causes transistor 72 to be shut-off or nonconductive to cut-off field current to field winding 36. When the voltage between line 68 and ground is below the desired regulated value, the transistor 72 is pulse-width modulated on and off that provides a field current that tends to increase the voltage on line 68 toward the desired regulated value. When the voltage on line 68 increases to a level where it exceeds the desired regulated value, transistor 72 shuts off. The pulse-width modulated control of field current is explained in above-referenced patent 4,636,706.

The field coil 36 is so wound and the direction of the current flow therethrough is such that disk portion 32 and pole fingers 32B have a north magnetic polarity and the disk portion 30A and pole fingers 30B have a south magnetic polarity. This is under the assumption that permanent magnets 54 have the magnetic polarities described above.

When no current is supplied to field coil 36, the flux developed by each permanent magnet 54 will flow from its north pole (face 54B) to its south pole (face 54A) in a path that is made up entirely of steel or iron with no air gaps in this path. The path is from a face 54B of a magnet 54 to a pole finger 32B, through disk portion 32A to pole core 34 and then through pole core 34, disk portion 30A and a pole finger 30B to a face 54A of a magnet 54. The flux path has been described for only one magnet 54 and it will be apparent that the flux path is the same for all twelve magnets. The flux developed by the permanent magnets 54 is retained within the rotor and does not link the output winding 18 except for a small quantity of magnetic leakage flux. Accordingly, the voltage induced in stator winding 18 is small. The flux path that has been described can be considered as diverting or shunting the permanent magnet flux away from the air gap between the rotor and stator core 16. Since pole fingers 30B and 32B form a shunt magnetic path, their cross-sectional areas are sized such that they are large enough to carry the permanent magnet flux.

Assume now that field coil 36 is energized. With the polarities of the permanent magnets and field coil, as has been described, the flow of permanent magnet flux through pole fingers 30B and 32B and core 34 is determined by the mmf developed by field coil 36. The mmf developed by field coil 36 opposes the mmf developed by the permanent magnets in the closed magnetic circuit comprised of pole members 30 and 32 and core 34. In regard to the development of an mmf by field coil 36, it will be appreciated that the mmf between pole fingers 30B and 32B varies as field current is varied and is zero with no field current. This said mmf determines the flux that flows through a path that includes pole fingers 32B through the air gap to stator core 16 through the air gap between stator core 16 and pole fingers 30B and then from pole fingers 30B through disk portion 30A and pole core 34. Permanent magnet flux can flow in two paths: one path, which diverts flux from the air gap between the rotor and stator is through pole fingers 30B and 32B and through core 34. The other path is from pole fingers 32B to stator core 16 and through stator core 16 to pole fingers 30B. From what has been described, it will be apparent that fluxes developed by the permanent magnet and by the field coil both link stator output winding 18 so that both fluxes now serve to cause a voltage to be induced in winding 18. The amount of permanent magnet flux that is diverted away from the stator core 16 depends on the amount of mmf developed by field coil 36. When there is no current supplied to field coil 36, all of the permanent magnet flux except for leakage is diverted away from stator core 16 because it flows through the previously described closed iron path, including pole fingers 30B and 32B and core 34. As field coil 36 is energized, less permanent magnet flux is diverted away from stator core 16. The amount of permanent magnet flux that is diverted away from stator core 16 will depend upon the magnitude of the mmf developed by field coil 36 which, in turn, depends upon the magnitude of field current supplied to field coil 36. At some intermediate level of field coil mmf, none of the flux developed by permanent magnets 54 is diverted away from stator core 16. As field coil mmf is further increased, all the permanent magnet flux plus field coil flux, less leakage, is delivered to stator core 16. Thus, the total air gap flux can be controlled from some near zero minimum to some maximum design value. In a practical application, the system may be configured such that at maximum field current, the total useful flux that links output winding 18 can be made up of 40% permanent magnet flux and 60% field coil flux.

It will be appreciated that the output voltage of output winding 18 can be maintained at a desired regulated value by the simple voltage regulating arrangement shown in FIG. 4 which supplies unidirectional current to field coil 36. Thus, when the output voltage of output winding 18 is below the desired regulated value, field current is increased. A field current increase has a twofold effect in increasing generator output voltage; that is, it causes less permanent flux to be diverted away from stator core 16 and it causes an increased field coil flux to link output winding 18 due to increased field current. When the output voltage of output winding 18 exceeds the desired regulated value, field current is reduced which reduces air gap flux. By using the generator structure in FIG. 1, which is capable of variably diverting permanent flux away from stator core 16 the simple voltage regulating arrangement shown in FIG. 4, can regulate the output voltage of the generator. There is no need to reverse the direction of current flow through field coil 36 to regulate the output voltage of the generator. Regulation is accomplished by supplying a variable unidirectional current to field coil 36.

Figure 3:
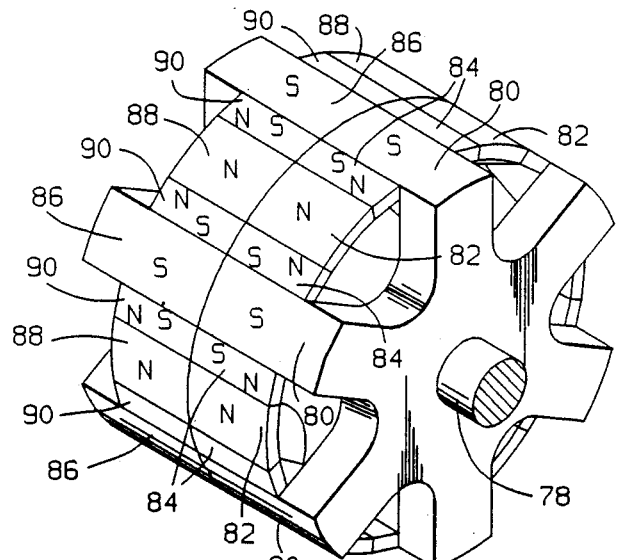
FIG. 3 is a perspective view of a modified rotor for an alternating current generator.

The concept disclosed above can be extended to alternators having twin rotor sections consisting of two back to back Lundell rotors on a common shaft. FIG. 3 illustrates such a rotor construction that can be substituted for the rotor of FIG. 1. The rotor of FIG. 3 uses two rotors supported by a common shaft 78 where each rotor is like the rotor shown in FIG. 1. One of the rotors is comprised of pole fingers 80 and 82 with permanent magnets 84 interposed therebetween. This rotor has a field coil and core like FIG. 1 which is not illustrated. The other rotor is comprised of pole fingers 86 and 88 with permanent magnets 90 interposed therebetween. This rotor also has a field coil and core like FIG. 1 which is not illustrated. The FIG. 3 rotor is constructed like the rotor shown in FIGS. 8 and 9 of patent application Ser. No. 263,850 filed on Oct. 28, 1988, now U.S. Pat. No. 4,882,515 which is incorporated herein by reference. The rotor shown in FIGS. 8 and 9 of application Ser. No. 263,850, now U.S. Pat. No. 4,882,515 is modified to the extent of replacing permanent magnet 94 with a field coil like field coil 90. Each rotor that has been described operates like the rotor shown in FIG. 1.

The two field coils of the rotor shown in FIG. 3 can be regulated by the system shown in FIG. 4. That is, the two field coils can be connected in series or in parallel and, thus, powered via transistor 72. The manner of connecting the field coils in series or in parallel is shown in FIGS. 6 and 7 of the above referenced patent application Ser. No. 263,850 now U.S. Pat. No. 4,882,515.

It will be appreciated that when the dual rotor of FIG. 3 is used as a component of an alternating current generator the length of the stator core 16 must be increased to accommodate the two rotors. The advantage of the construction shown in FIG. 3 is that greater output power can be obtained for a given rotor diameter.

The embodiments of the invention in which an exclusive property or privilege is claimed are defined as follows:

1. An alternating current generator comprising, frame means, a stator supported by said frame means comprising a stator core formed of magnet material that has slots, an output winding carried by said stator core including conductors disposed within said slots, a rotor supported by rotation by said frame means disposed within said stator core, said stator core and rotor being spaced to provide an air gap between said rotor and stator core, said rotor comprising a shaft, first and second claw-pole members formed of magnetic material carried by said shaft, said first claw-pole member having a plurality of first circumferentially spaced and axially extending pole fingers, said second claw-pole member having a plurality of second circumferentially spaced and axially extending pole fingers, said first and second claw-pole members being so oriented on said shaft that the pole fingers of said first and second claw-pole members are interleaved, a rotor core formed of magnetic material carried by said shaft interposed between said claw-pole members having opposite ends respectively engaging said claw-pole members, a field coil disposed about said rotor core, slip rings carried by said shaft electrically connected to opposite sides of said field coil, brushes engaging said slip rings adapted to be connected to a source of unidirectional current to energize said field coil, a plurality of permanent magnets respectively interposed between said first and second circumferentially spaced axially extending pole fingers, each permanent magnet having a first end face engaging a side surface of said circumferentially spaced axially extending first pole finger and a second opposite end face engaging a side surface of said circumferentially spaced axially extending second pole finger, said end faces of said permanent magnets having opposite magnetic polarities and said magnets being so oriented that magnet end faces of like magnetic polarity respectively engage opposed side surfaces of a given pole finger, said first and second claw-pole members and said rotor core member defining a closed magnetic circuit formed entirely of magnetic material that magnetically connects opposed end faces of all said permanent magnets, said magnetic circuit shunting said air gap between said rotor and stator core whereby the flux developed by said permanent magnets is diverted from said air gap by said magnetic circuit and only leakage flux developed by said permanent magnets traverses said stator core when said field coil is not energized, said field coil when energized with unidirectional current developing a field mmf in said magnetic circuit that is in such a direction as to oppose the mmf developed by said permanent magnets in said magnetic circuit whereby flux developed by said permanent magnets is caused to traverse said air gap through a path that includes adjacent first and second pole fingers, the flux developed by said field coil traversing said air gap and being applied to said stator core by said first and second pole fingers, the amount of permanent magnet flux applied to said stator core increasing as the unidirectional current applied to said field coil increases.

2. A voltage regulated alternating current generator comprising, frame means, said circumferentially spaced axially extending stator supported by said frame means comprising a stator core formed of magnetic material that has slots, an output winding carried by said stator core including conductors disposed within said slots, a rotor supported for rotation by said frame means disposed within said stator core, said stator core and rotor being spaced to provide an air gap between said rotor and stator core, said rotor comprising a shaft, first and second claw-pole members formed of magnetic material carried by said shaft, said first claw-pole member having a plurality of first circumferentially spaced and axially extending pole fingers, said second claw-pole member having a plurality of second circumferentially spaced and axially extending pole fingers, said first and second claw-pole members being so oriented on said shaft that the pole fingers of said first and second claw-pole members are interleaved, a rotor core formed of magnetic material carried by said shaft interposed between said claw-pole members having opposite ends respectively engaging said claw-pole members, a field coil disposed about said rotor core, slip rings carried by said shaft electrically connected to opposite sides of said field coil, brushes engaging said slip rings adapted to be connected to a source of unidirectional current to energize said field coil, a plurality of permanent magnets respectively interposed between said first and second pole fingers, each permanent magnet having a first end face engaging a side surface of a first pole and said circumferentially spaced axially extending a second opposite end face engaging a side surface of a second pole finger, said end faces of said permanent magnets having opposite magnetic polarities and said magnets being so oriented that magnet end faces of like magnetic polarity respectively engage opposed side surfaces of a given pole finger, said first and second claw-pole members and said rotor core member defining a closed magnetic circuit formed entirely of magnetic material that magnetically connects opposed end faces of all said permanent magnets, said magnetic circuit shunting said air gap between said rotor and stator core whereby the flux developed by said permanent magnets is diverted from said air gap by said magnetic circuit and only leakage flux developed by said permanent magnets traverses said stator core when said field coil is not energized, said field coil when energized with unidirectional current developing a field mmf in said magnetic circuit that is in such a direction as to oppose the mmf developed by said permanent magnets in said magnetic circuit whereby flux developed by said permanent magnets is caused to traverse said air gap through a path that includes adjacent first and second pole fingers, the flux developed by said field coil traversing said air gap and being applied to said stator core by said first and second pole fingers, the amount of permanent magnet flux applied to said stator core increasing as the unidirectional current applied to said field coil increases, and voltage regulating means for maintaining the output voltage of said generator at a desired regulated value, said regulating means applying direct field current to said field coil in only one direction through said field coil, said regulating means including means for varying the magnitude of said direct field current as an inverse function of the output voltage of the generator.

* * * * *